United States Patent
Jarvis et al.

(10) Patent No.: US 9,335,400 B2
(45) Date of Patent: May 10, 2016

(54) INDOOR POSITIONING USING CAMERA AND OPTICAL SIGNAL

(71) Applicant: QUALCOMM TECHNOLOGIES INTERNATIONAL, LTD., Cambridge (GB)

(72) Inventors: Murray Robert Jarvis, Stapleford (GB); Nicolas Graube, Barrington (GB)

(73) Assignee: QUALCOMM TECHNOLOGIES INTERNATIONAL, LTD., Cambridge (GB)

(*) Notice: Subject to any disclaimer, the term of this patent is extended or adjusted under 35 U.S.C. 154(b) by 0 days.

(21) Appl. No.: 14/496,043

(22) Filed: Sep. 25, 2014

(65) Prior Publication Data
US 2015/0010241 A1  Jan. 8, 2015

Related U.S. Application Data

(62) Division of application No. 13/689,937, filed on Nov. 30, 2012, now Pat. No. 8,874,135.

(51) Int. Cl.
*H04W 24/00* (2009.01)
*G01S 5/14* (2006.01)
*G06K 9/00* (2006.01)
*G06F 17/30* (2006.01)
*H04W 64/00* (2009.01)

(52) U.S. Cl.
CPC .............. *G01S 5/14* (2013.01); *G06F 17/30247* (2013.01); *G06K 9/00577* (2013.01); *G06K 9/00771* (2013.01); *H04W 24/00* (2013.01); *H04W 64/003* (2013.01)

(58) Field of Classification Search
CPC ... H04W 64/00; H04W 4/02; H04L 29/08657
USPC .............................. 455/456.1–456.5; 382/209
See application file for complete search history.

(56) References Cited

U.S. PATENT DOCUMENTS 6,720,922 B2 * 4/2004 Williams et al. .............. 342/465
8,634,848 B1 * 1/2014 Bozarth et al. ............. 455/456.1
(Continued)

FOREIGN PATENT DOCUMENTS

WO   WO 2011/141531   11/2011
WO   WO 2012/138407   10/2012

OTHER PUBLICATIONS

Ruiz-Ruiz et al., "A multisensory LBS using SIFT-based 3D models", 2012 International Conference on Indoor Positioning and Indoor Navigation, Nov. 13, 2012.
Kariekar et al., "Positioning, Tracking and Mapping for Outdoor Augmentation", 9th IEEE International Symposium on Mixed and Augmented Reality (ISMAR), Oct. 13, 2010.
(Continued)

*Primary Examiner* — Nathan Taylor
(74) *Attorney, Agent, or Firm* — The Marbury Law Group, PLLC

(57) ABSTRACT

A method for detecting a collector device in an indoor area associated with imaging devices covering the area includes a plurality of collector devices emitting markers to the imaging devices coupled to a server. The imaging devices capture the images of the collector devices including the markers. The images are processed in order to determine the current positions of the collector devices corresponding to the markers. The server and the collector device communicate with each other and match a current position corresponding to the collector device among the plurality of collector devices.

10 Claims, 8 Drawing Sheets

(56) References Cited

U.S. PATENT DOCUMENTS

| | | |
|---|---|---|
| 8,874,135 B2 | 10/2014 | Jarvis et al. |
| 2005/0213082 A1* | 9/2005 | DiBernardo et al. .... 356/139.03 |
| 2010/0066821 A1* | 3/2010 | Rosener et al. ................. 348/77 |
| 2013/0053053 A1* | 2/2013 | Agarwal et al. ............ 455/456.1 |
| 2013/0083631 A1* | 4/2013 | Harrell et al. ................. 367/127 |
| 2013/0141554 A1* | 6/2013 | Ganick et al. .................. 348/61 |

OTHER PUBLICATIONS

Werner et al., "Indoor Positioning Using Smartphone Camera", 2011 International Conference on Indoor Positioning, and Indoor Navigation (IPIN), Sep. 21, 2011.

GB Search Report issued in related GB Application No. GB1320235.3, dated May 27, 2014.

Office Action for U.S. Appl. No. 13/689,937, dated Mar. 14, 2014.

* cited by examiner

Server

Collector Device

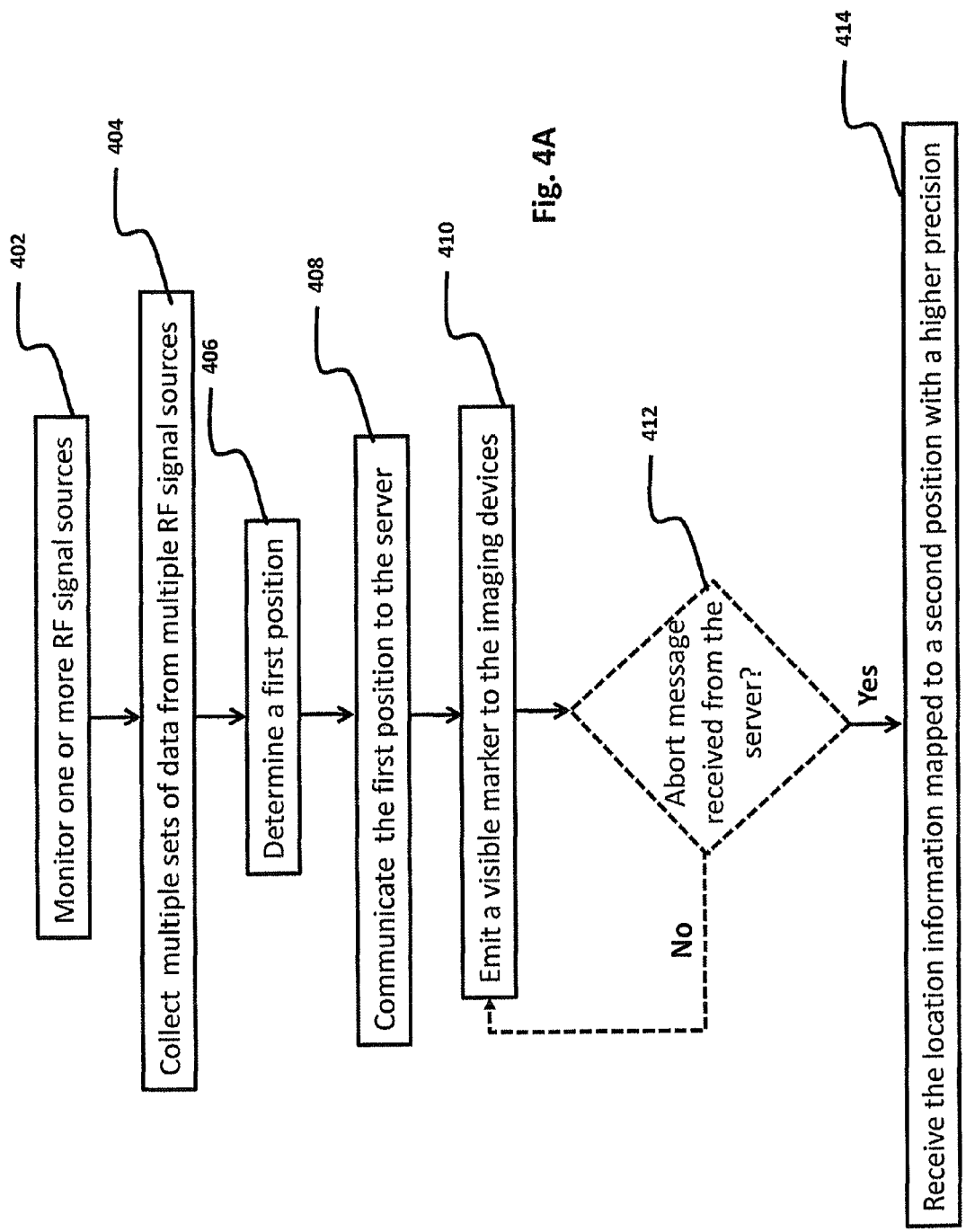

INDOOR POSITIONING USING CAMERA AND OPTICAL SIGNAL

CROSS REFERENCE TO RELATED APPLICATIONS

This application is a Divisional Application of U.S. application Ser. No. 13/689,937, filed Nov. 30, 2012, the contents of which are incorporated herein by reference.

FIELD OF THE INVENTION

The present invention is directed toward indoor positioning of mobile devices and in particular to systems and methods in order to locate mobile devices using a combination of image processing and information including optical signals provided by the mobile devices.

BACKGROUND

Outdoor positioning of a mobile device can be achieved using Global Navigation Satellite System (GNSS). In conventional GNSS, the mobile device may collect information from the satellites. The collected information may then be used to compute the location (longitude, latitude, altitude) of the mobile device to within a few meters. A mobile device may also determine its position by triangulating or trilaterating signals from cell-phone transmitters.

SUMMARY OF THE INVENTION

An example embodiment of the present invention includes a method for detecting a collector device in an indoor area associated with imaging devices covering the area. The method includes a plurality of collector devices emitting markers to the imaging devices coupled to a server. The imaging devices capture the images of the collector devices including the markers. The images are processed in order to determine the current positions of the collector devices corresponding to the markers. The server and the collector device communicate with each other and match a current position corresponding to the collector device among the plurality of collector devices.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures:

FIG. 4A is a flow-chart diagram of an embodiment depicting a method of a collector device transmitting and receiving position information for determining a precise location of the collector device.

DETAILED DESCRIPTION

Outdoor positioning of a collector device can be achieved by employing GNSS. However, for indoor positioning, GNSS may not be suitable. A collector device may determine its position in an indoor environment by triangulating or trilaterating signals from cell-phone transmitters, however, this may pose further difficulties because of antenna characteristics, reflections and obstructions in the indoor environment. Embodiments of the invention overcome the limitations of indoor positioning by locating a collector device in an environment covered by a set of imaging devices (video or still-frame). Particularly, collector devices are located using positional information of the collector device in the image captured by the imaging device. Specifically, imaging devices can capture digital images, composed of a plurality of pixels, that cover a finite environment and that are mapped to positions. Collector devices capable of making themselves visible/recognized to imaging devices (at least one) can thus be located by determining the position corresponding to the occupied pixel(s) in the captured image. Standard techniques using comparison with the image of empty scene, frame differences and object recognition can be used to locate a person/device given the pixel location.

A collector device emitting an infrared signal can easily be recognized on the imaging device. Alternatively any other signature visible to the imaging device but not necessarily to the eye could be used. Identification of the collector device can be done in many ways. For example, the collector device may emit identification information to be detected by the imaging devices over a set number of images. The identification information may be in the form of amplitude, time or frequency modulated signals. Alternatively, identification information may be in the form of a single pulse signal communicated at a specific agreed time, between the collector device and the server, for example. The signal emitted by the collector device is referred to herein as a "marker."

Identification of the imaging devices may be performed by the server based on the coarse position of the collector device received by the server.

Figure 1A:
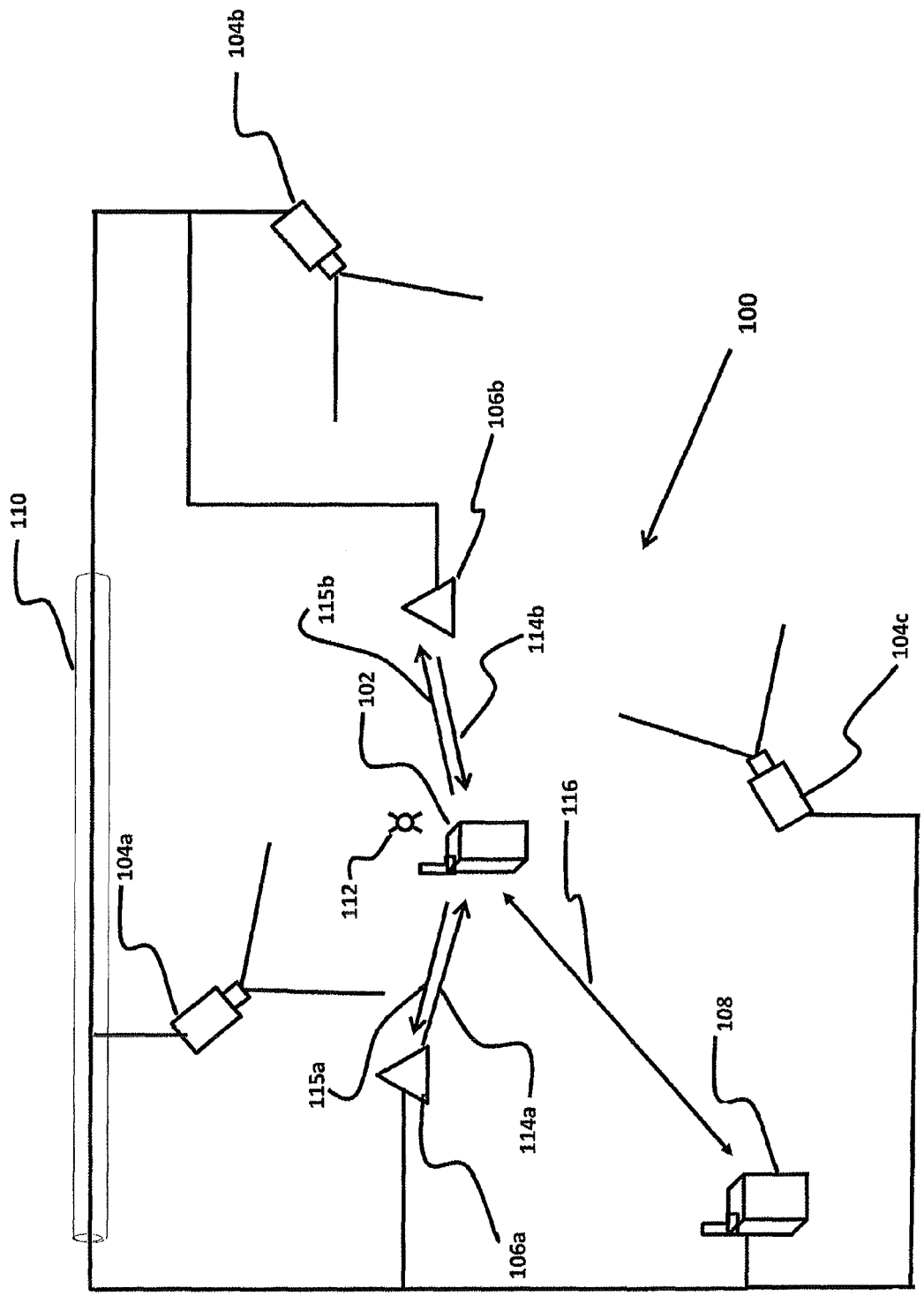
FIG. 1A is a block diagram depicting one embodiment of a system for automatically determining a location of a collector device.

FIG. 1A illustrates a system 100 for determining the location of a collector device 102 in accordance with an embodiment of the present invention. The illustrated system includes a plurality of collector devices 102 *a-n* (only one device 102 is shown in FIG. 1), a plurality of imaging devices 104 *a-n* (only three imaging devices 104*a-c* are shown in FIG. 1) coupled to a server 108, and a plurality of RF signal sources 106 *a-n* (only two RF signal sources 106*a-b* are shown in FIG. 1). The example imaging devices 104 *a-c* are coupled to the server 108 via the network 110 (wired or wireless). This network may be, for example, the same network to which the signal sources 106*a-b* are connected.

The RF signal sources may be, for example, any terrestrial RF transmitter or transmitter/receiver of wireless or RF signals, for example, IEEE 802.11 (WiFi) access points. Other examples of RF signal sources may include Bluetooth® access points or other types of RF signal sources operating, for example, in the industrial, scientific and medical (ISM) band. The collector devices may be, for example, mobile telephones, Bluetooth or IEEE 802.11 or other ISM devices that are configured to receive the RF signals 114 *a-b* transmitted by the RF signal sources 106 *a-b*. The RF signals 114 *a-b* may include information that can be used to identify and locate the signal source, for example WiFi signals may include an access point identifier (e.g. media access control identifier (MAC ID)), received signal strength indication (RSSI), time or phase offsets of received signals and/or round-trip delay time (RTT), which may be processed by the collector device 102 in order to determine a coarse position. Alternatively, the server 108 may receive this information via RF signals conveyed through logical communication path 116 from the collector device 102 and further process the information in order to calculate the coarse position of the collector device.

Each collector device 102 may also or alternatively determine a coarse position Using signal strength or timing information from cell-phone transmitters for example using triangulation, trilaterating, cell identity or fingerprinting techniques, or by using information manually provided by a user such as a position on a map.

The collector device 102 communicates the coarse position to the server 108 using communication signals 116.

If the collector device provides its coarse position, the server 108 processes the coarse position information of the collector device 102 to determine a set of imaging devices 104 *a-c* from the plurality of imaging devices 104 *a-n* that may be able to capture images of the collector device 102. Alternatively, if the collector device does not determine its coarse position, the server 108 may receive information, for example the strengths of the RF signals 114 *a-b*, captured by the collector device 102, in order to determine the coarse position of the collector device 102 and then determine which imaging devices to use.

As illustrated in FIG. 1A, for example, the server 108 may select the imaging devices 104 *a-c* to capture images of the collector device based on the coarse position information. Imaging devices 104*a* and 104*b* may capture images of the collector device 102 successfully. Imaging device 104*c*, however, may not.

The collector devices may be, for example, also configured to emit markers 112 to the imaging devices 104 *a-n*. The markers could be electromagnetic waves, visible to the human eye, and have wavelengths in the range of 400 nm-750 nm. Alternatively, or in addition, and without limitation the markers could be electromagnetic waves, in the infra-red spectrum and invisible to the human eye, with wavelengths in the range of 750-900 nm, and in particular 850 nm, for example.

The imaging devices may be, for example, cameras, that are configured to capture still-frames or video.

For example, imaging devices 104 may be infra-red cameras. As such, the emitted markers 112, for example infra-red signals, may be distinctly visible in the images captured by the imaging devices 104. Alternatively, imaging devices 104 may be color cameras, where markers 114 in the form of infra-red signals for example, may appear as bright spots in the captured images. The presence of an infrared signal may also be determined by modulating the infrared signal over several frames and correlating the modulated signal to a known pattern.

It may be desirable to calibrate the imaging devices in order to develop a correspondence between pixels in the image and positions in the area being imaged. Each point in the image may correspond, for example to a ray, which, in turn, may correspond to a set of positions along the ray. Calibration of the imaging devices may be performed, for example, during a setup stage as follows. Four calibration points may be chosen in the indoor area for calibrating a specific camera, for example. The calibration points, representing points along respective rays, may be assigned to known geometrical co-ordinates. Thereafter, points in the image may be interpolated and mapped back to a corresponding rays in the indoor area covered by the image. The intersection of rays from multiple cameras may be used to precisely locate an object. Image processing may be performed by the server 108, for example. Alternatively or concurrently, image processing may be performed by the imaging devices, for example, which may reduce the burden of data on the network 110. Alternatively, calibration of the imaging devices may not be necessary, if stereo images are captured by the imaging devices having known locations and focal lengths.

The server 108 may be configured to receive images including the markers 112 from the imaging devices via the network 110. The server further processes the images including the markers 112 in order to map the coarse location to a precise location. The server 108 further communicates the precise location to the collector device 102 via the communication signals 116.

Figure 1B:
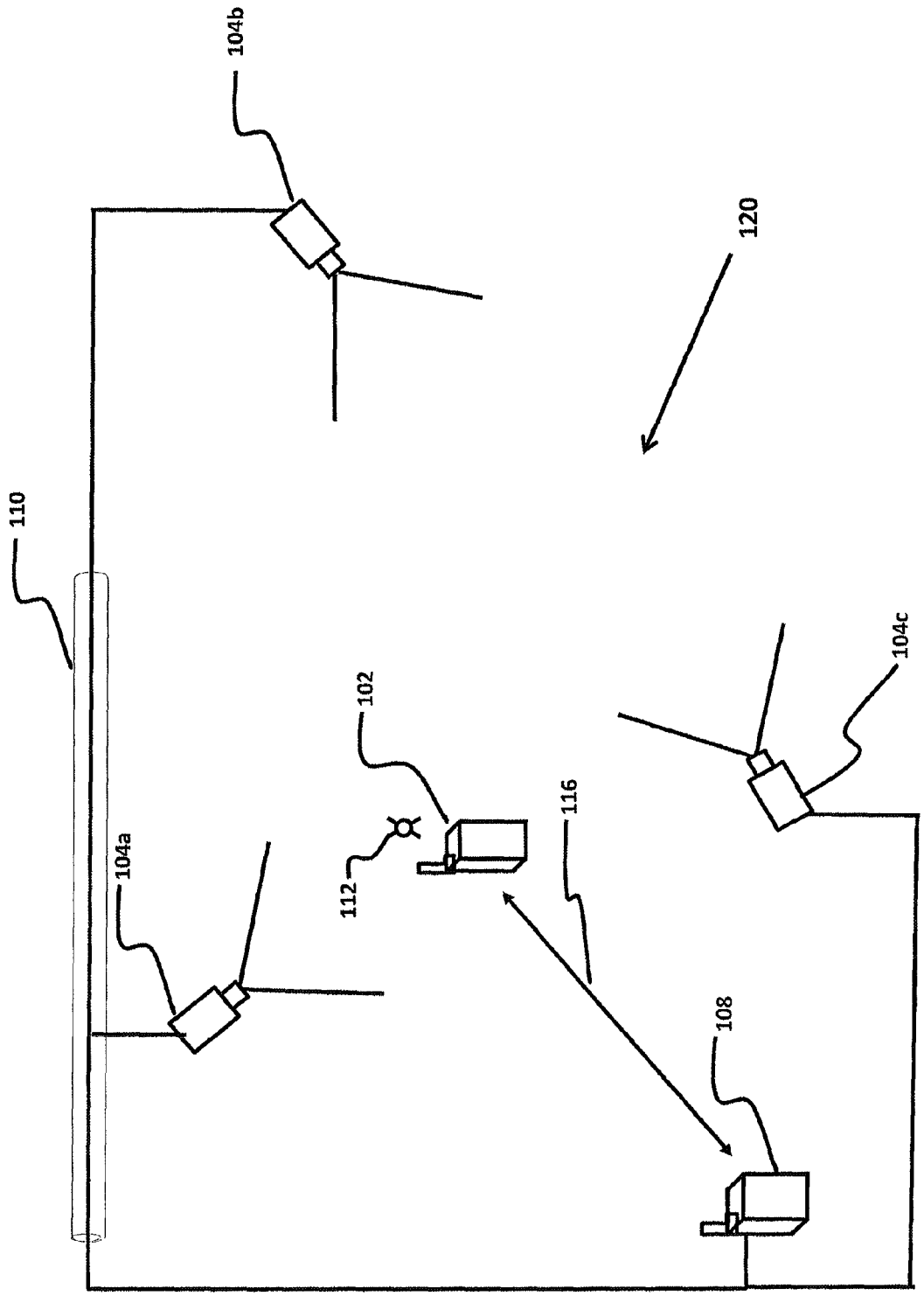
FIG. 1B is a block diagram depicting another embodiment of a system for automatically determining a location of a collector device.

FIG. 1B illustrates a system 120 for determining the location of a collector device 102 in accordance with an another embodiment of the present invention.

As illustrated in FIG. 1B, system 120 is similar to the system 100 in FIG. 1A, except system 120 does not have the RF signal sources 106 *a-b*. As such, the location of the collector device 102 may be determined as follows.

Processors coupled to imaging devices 104 *a-n*, or server 108 coupled to the imaging devices, may be configured to process the captured image frames for the collector devices 102 *a-n* emitting markers 112. The imaging devices and, or the server may also be configured to process the captured image frames of the collector devices 102 *a-n* emitting markers 112. The scanning may be performed in continuous fashion in order to locate the markers emitted by the collector devices. The scanning process may include imaging devices performing tilt, pan, roll, zoom and other similar functions in order to locate the markers.

If the markers 112 are modulated signals, the imaging devices and/or the server 108 may also be configured to decode modulation information.

The server 108 may be configured to receive and possibly process images captured by the imaging devices and further calculate a plurality of current positions and a plurality of times of identification for the markers. The current positions have higher precision than the coarse positions. The server 108 may further be configured to respond to requests sent by the collector device 102 for the current positions and times of identification corresponding to the markers. The current positions may be within the uncertainty of coarse positions.

The collector device 102 may then match a current position from the plurality of current positions corresponding to the marker 112 and the time of identification for locating its precise position. The matching of the current position performed by the collector device 102 may use time synchronization (as explained below).

Figure 2B:
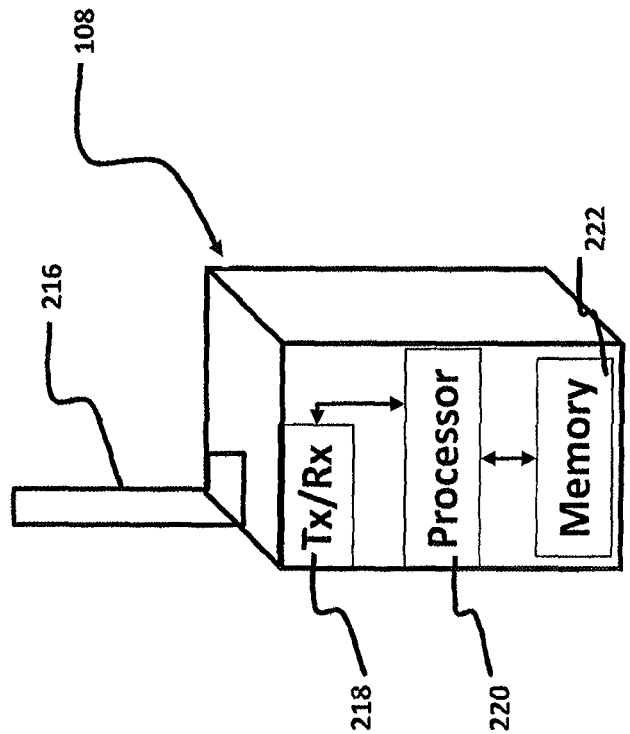
FIG. 2B is a block diagram depicting one embodiment of a server.
Figure 2A:
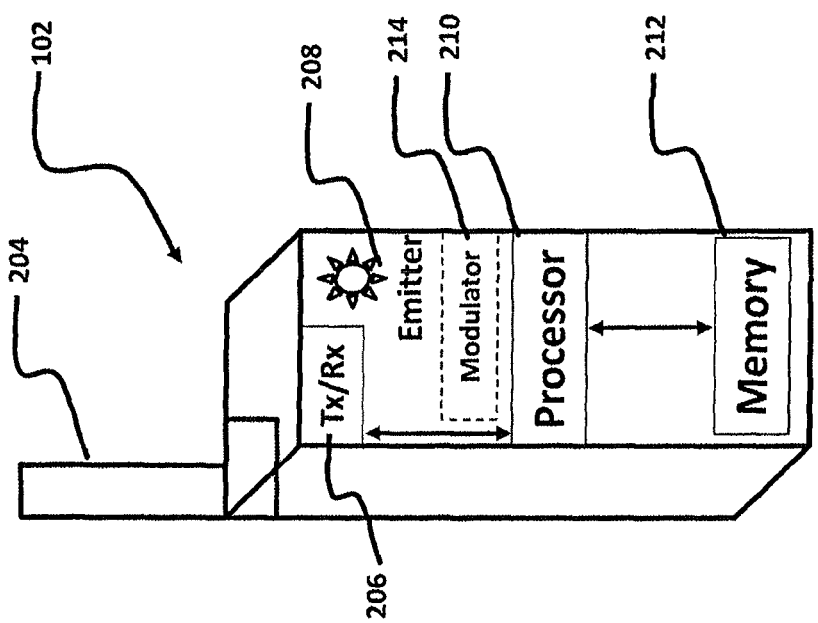
FIG. 2A is a block diagram depicting one embodiment of a collector device.

FIG. 2A depicts a collector device 102 in accordance with aspects of the present invention. The example collector device includes at least one antenna 204, receiver or transmitter/receiver 206, emitter 208, processor 210, memory 212 and modulator 214.

Memory 212 may store instructions for the processor 210 and data used by the collector device 102.

Processor 210 may be used by the collector device 102 to process data collected or monitored in order to determine a coarse position. In addition, the processor 210 may control other functions of the collector device 102. For example, if the collector device is a mobile telephone, the processor 210 may process audio information or data transmitted through the communication channels.

In general, the collector device 102 includes receiver or transmitter/receiver 206 to monitor the signal characteristics of the RF signal sources 106 via the antenna 204 and, in one embodiment of the invention, transmit the coarse position information to the server 108. Alternatively, the transmitter/receiver 206 may transmit the signal characteristics of the RF signal sources to the sever 108 via the antenna 204. The collector device 102 may transmit or receive information contemporaneously, at predetermined times or as requested by the server 108. Although the collector device is illustrated as having one antenna 204 for both receiving and transmitting data, it is contemplated that separate antennas may be used. In addition, each transmit and/or receive antenna may include separate antenna elements, for example, to implement antenna diversity or directional transmission or reception using phased arrays of antenna elements.

Emitter 208 may emit markers 112 that may be captured by the imaging devices. The example emitter 208 may be an optical transmitter (e.g. one or more light emitting diodes) which transmits optical signals or markers that are visible to the imaging devices and may not necessarily be visible to the human eye. The markers emitted by the emitter 208 included in the collector device 102 may, for example, be electromagnetic waves in the range of 400 nm to 900 nm.

The emission of the markers from the emitter 208 may be controlled/triggered by a user. For example, a user may control the collector device 102 such that the emitter 208 may emit markers as flashes or otherwise modulated by the modulator 214 in order to convey the identification of the collector device 102, which may be decoded by the imaging device 104. Alternatively, the server 108 may control when markers are emitted by the emitter 208, by sending instructions to the collector device 102 or assigning a modulation pattern, for example. As another alternative, the emission of a marker may be triggered by an application being executed by the collector device 102, for example, the marker may be emitted a set time after a position request has been sent to the server to allow the server sufficient time to prepare the relevant cameras to receive the marker. As yet another alternative, a signal received from an RF signal source 106 may trigger the emission of the marker.

FIG. 2B is a schematic illustration depicting one example embodiment of a server 108. In this embodiment, the server 108 communicates with the collector device 102 using its transmitter/receiver 218 via the antenna 216. It is contemplated, however, that the server 108 may be implemented without an antenna. Thus, in one example, the server 108 may be coupled to a network 110 to receive data from the collector devices 102 which, may in turn, transmit RF signal data 115 a-b either through a separate cellular network or through the network 110 via the RF signal sources 106 connected to the network 110.

The transmitter/receiver 218 may be used to receive other messages as well. For example, the transmitter/receiver 218 may receive messages from the collector device 102 including signal characteristics of the RF signal sources in order to determine coarse positions of the collector devices. Alternatively, the transmitter/receiver 218 may receive coarse position information of the collector device 102. The server 108 may also communicate with the imaging devices and receive images or analyzed position information from the imaging devices.

The processor 220 included in the server 108 may process the captured images received from the imaging devices in order to determine current locations and times of identification corresponding to the markers contained in the captured images. The processor 220 may also process data received from the collector device 102. Transmitter/receiver 218 may transmit information on current positions and times of identification in response to requests from the collector device 102. The processor 220 may further process images in order to map the location of the collector device 102 to a precise location based on the coarse position.

Figure 3:
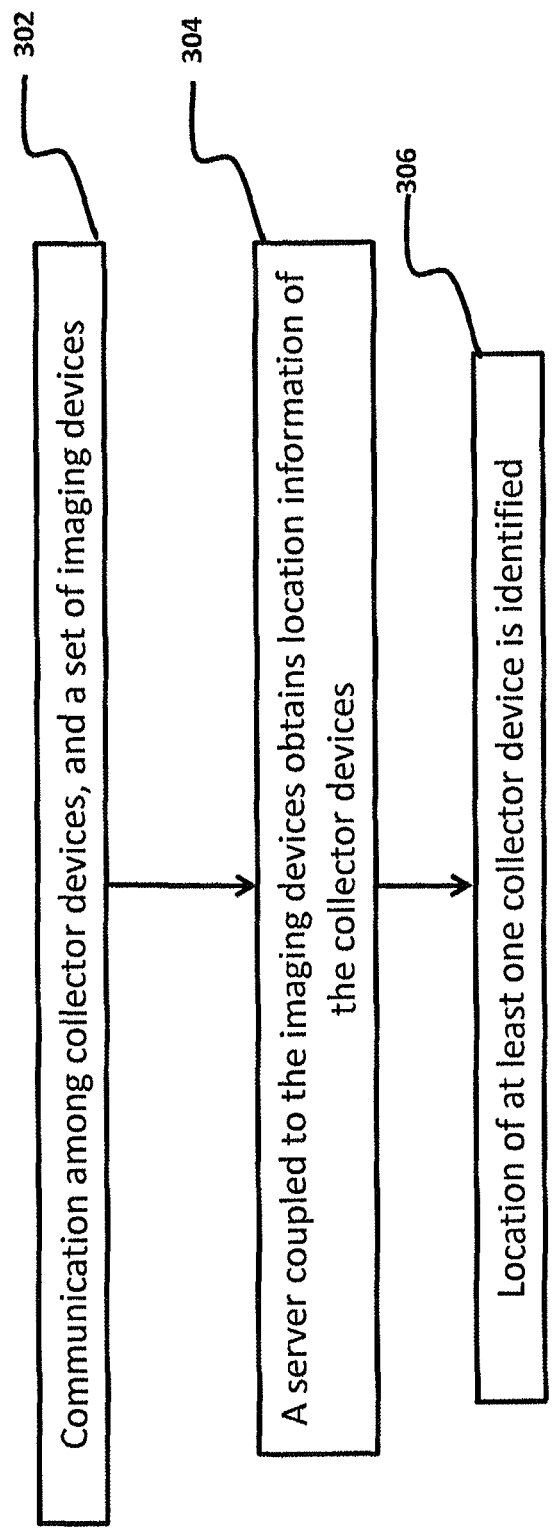
FIG. 3 is a flow-chart diagram depicting the high level processes for determining a location of a collector device.

FIG. 3 is a flow diagram outlining the high level steps used for locating a collector device 102 in an indoor environment as illustrated in FIGS. 1A and 1B, for example. At step 302, communication among collector devices and a set of imaging devices take place. For example, the collector devices 102 may emit markers 112 to the imaging devices 104 (in FIG. 1B, the collector device 102 and imaging devices 104 a-c are shown). Next, at step 304, the server 108 may obtain location information of the collector devices based on step 302. Alternatively, if RF signal sources are present, the server may obtain coarse location information of the collector device via RF signals 116. The server may further process the coarse location information in order to identify the imaging devices for capturing images of the collector device. Next, at step 306, location of at least one of the collector devices is identified based on the information at step 304. Alternatively, the server 108 may further process the images captured by the imaging device in order to obtain fine position information of the collector device. The fine position information may have higher precision than the coarse position information.

FIG. 4A is a flow diagram depicting a more detailed view of the method used by the collector device 102 in order to precisely locate its position. FIG. 4A may be better understood in conjunction with FIG. 1A. At step 402, the collector device 102 monitors multiple RF signal sources (for example, RF signal sources 106 a-b in FIG. 1). Next, at step 404, the collector device 102 collects multiple sets of data from the monitored RF signal sources. For example, the transmitter/receiver 206 of the collector device 102 may be used to receive data via the antenna 204 and to store the received data in the memory 212. The collected sets of data may be, for example, the signal strengths of RF signals 114 a-b, as shown in FIG. 1A, and may include information, for example, access point identifier (e.g. media access control identifier (MAC ID)), received signal strength indication (RSSI), time or phase offsets of received signals and/or round-trip delay time (RTT).

At step 406, the collector device 102 determines a first position. For example, the processor 210 of the collector device 102 may process the collected information at step 404 in order to determine a coarse location of the collector device. Alternatively, the collector device 102 may send the collected information at step 404 to the server 108.

The collector device communicates the first position that is determined at step 406 to the server 108, as shown in FIG. 1. Communication by the collector deice 102 may be performed using the transmitter/receiver 206 via the antenna 204 as described in step 404, for example. The collector device 102 may communicate directly with the server or alternatively via the RF signal sources connected to the network 110, as shown in FIG. 1.

Next, at step 410, the collector device 102 may emit markers 112 to the imaging devices that are coupled to the network 110. For example, the emitter 208 may emit the markers 112. The markers 112 may be for example, optical signals that are visible to the imaging devices that are along a line-of-sight (for example in FIG. 1A, imaging devices 104a-b are along the line-of-sight of the collector device 102, but not the imaging device 104c). The markers 112, however, may or may not be visible to the human eye. The collector device 102 may continue to emit markers for a predetermined amount of time or until it receives an abort message from the server 108 at step 412. At final step 414, the collector device receives second location information from the server 108 based on the first coarse position. The second position may have a higher precision than the first coarse position that was determined at step 406.

As an alternative to steps 408 and 410, the collector device 102 may communicate its first position to the server and wait for the server 108 to acknowledge the communication. The collector device 102 may then start emitting markers 112. Prior to acknowledging the communication from the collector device 102, the server 108 may prime the imaging devices 104 so that they are conditioned to receive the markers 112 as soon as they are emitted by the collector devices 102. This may simplify the infra-structure of the imagers and reduce communication cost as images will be collected and processed only when necessary. This also increases privacy. Once started, the emission of Markers may continue either for a set time or until the server tells the collector to stop.

It is contemplated that, a non-transitory computer readable medium may store computer readable instructions for machine execution of the steps 402-410.

Figure 4B:
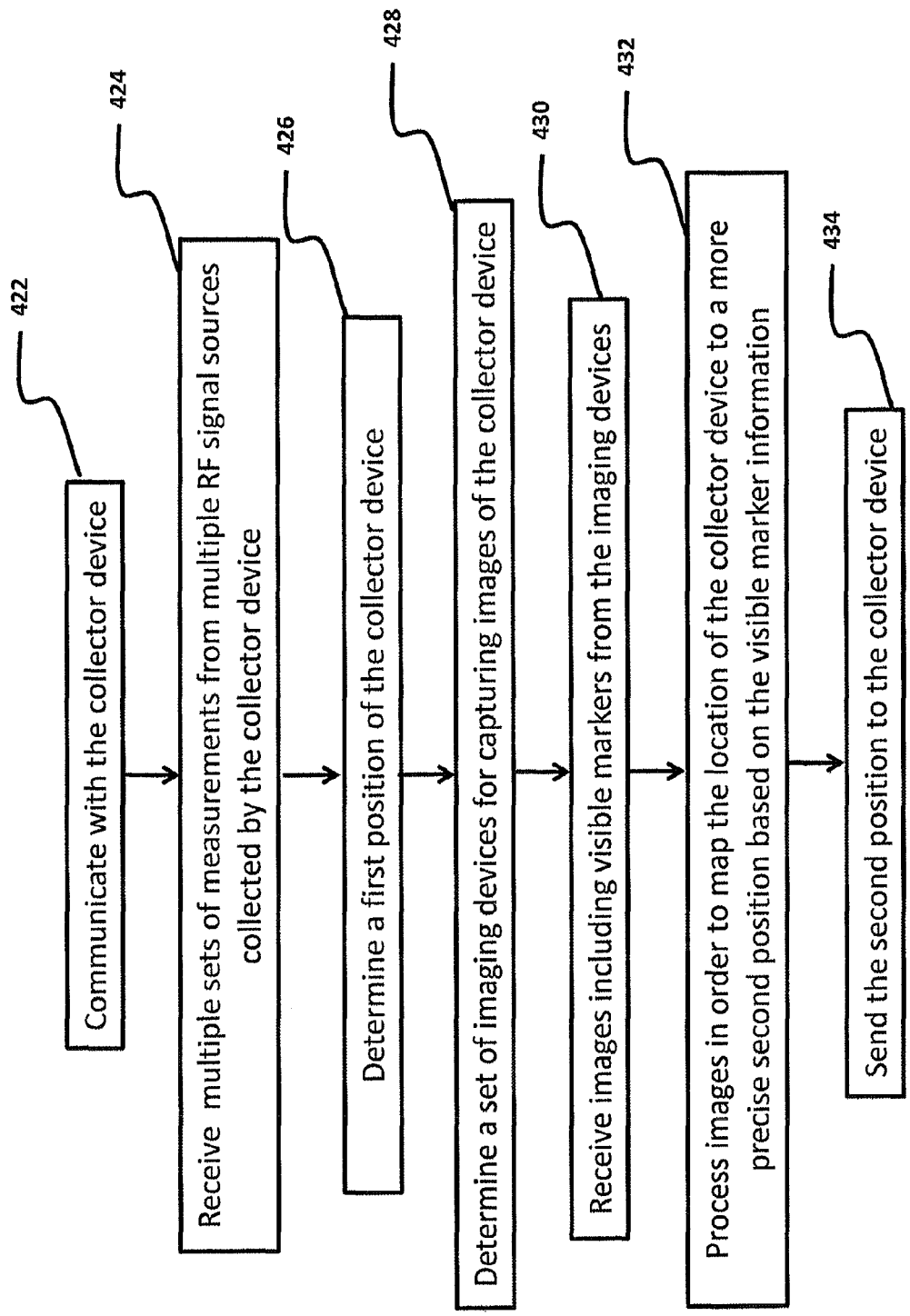
FIG. 4B is a flow-chart diagram of an embodiment depicting a method of a server transmitting and receiving position information for determining a precise location of the collector device.

FIG. 4B is a flow diagram depicting a more detailed view of the method used by the server 108 to precisely locate the position of the collector device and may be better understood in conjunction with FIG. 1A.

At step 422, the server 108 communicates with the collector device 102. For example, as shown in FIG. 1A, the server may use the network 110 or the transmitter/receiver 218 and antenna 216 using communication signals 116. Communication using the network 110 may be via the RF signal sources 112 coupled to the network 110 or by a separate (e.g. cellular) network. Next at step 424, the server 108 receives multiple sets of measurements from multiple RF signal sources (only 106 a-b are shown in FIG. 1) collected by the collector device 102. Using this data, the server 108 may then determine a first position, which is a coarse position of the collector device 102 at step 426. Next at step 428, the sever 108 determines a set of imaging devices coupled to the network 110 that are the best candidates to capture images of the collector device 102 based on the calculated coarse positions. For example, as shown in FIG. 1A, the server 108 may select imaging devices 104 a-c for capturing the images of the collector device 102. At step 430, the server 108 may receive images from imaging devices 104 a-c, however, markers may only be present in the images captured by the imaging device 104 a-b as they are in the line-of-sight of the collector device. The images received at step 430 by the server 108 include markers emitted by the collector device 102 as shown in FIG. 1, for example. Alternatively, the server 108 may not receive images if image processing is done by the imaging devices. At step 432, the processor 220 of the server 108 may process the images received at step 430 in order to map the location of the collector device to a second position based on the marker information. The second position may have higher precision than the first position determined at step 426. At the final step of 434, the server sends the second position to the collector device 102 wirelessly as explained at step 422, for example.

Figure 5A:
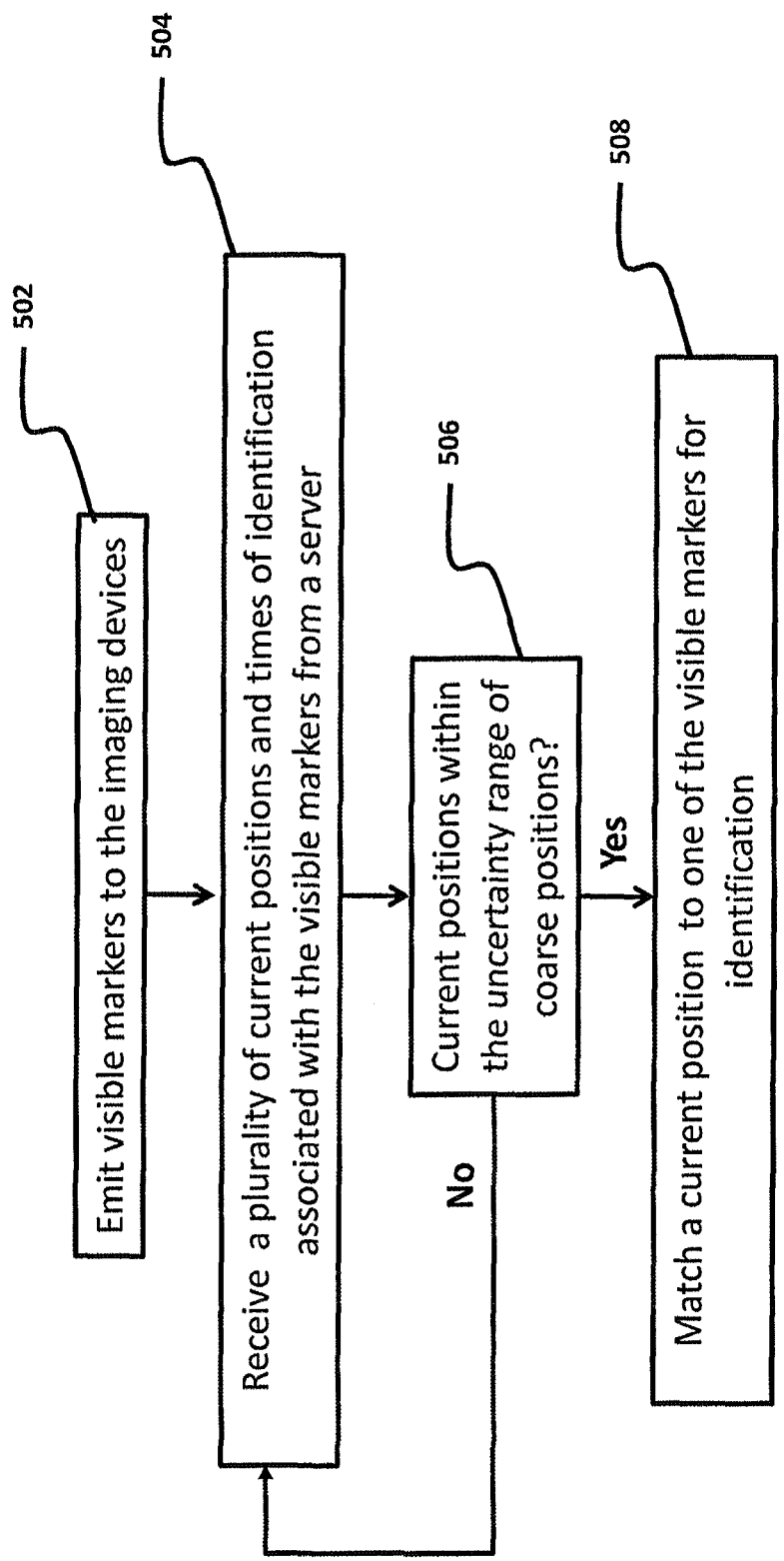
FIG. 5A is a flow-chart diagram of an another embodiment depicting a method of a collector device transmitting and receiving position information for automatically determining a precise location of the collector device.

FIG. 5A is a flow diagram depicting a more detailed view of an alternative method that may be used by the collector 102 in order to precisely locate its position in an indoor environment without RF signal sources as shown in FIG. 1B. At step 502, a plurality of the collector devices 102a-n emit a plurality of markers 112a-n to the imaging devices 104 coupled to the network 110. For example, emitter 208 of the collector device 102 may emit markers 112 to a set of imaging devices 104 a-c, which are constantly scanning the indoor environment where the collector devices 102 are present. However, only the imaging devices 104a-b, which are in the line-of-sight of the collector device 102, receive the markers.

The imaging devices 104 may then calculate current positions and the time of identification of the collector devices and send them to the server 108, for example. This may reduce the burden of data on the network 110.

Alternatively, the imaging devices may send the images including the markers to the server 108, which may then determine the current positions and times of identification of the collector devices 102.

Next, at step 504, the collector device 102 may receive a plurality of current positions and times of identification associated with the markers from the server 108. For example, the receiver/transmitter 206 via the antenna 204 of the collector device 102 may be used to receive the data.

At step 506, the collector device 102 may check whether the current positions received at step 504 are within a range of uncertainty of the coarse positions. Where the positions may be based on floor location information in a map, or a previously determined location, for example the range of uncertainty may be a range of possible positions on the floor or a range of possible positions from the previous position. If the collector device 102 has a positive response from step 506, it may then proceed to step 508. At step 508, the collector device 102 may match its identity to at least one of the current positions. Furthermore, the collector device 102 may keep receiving the information at step 504 until a positive response is confirmed.

In another example, multiple collector devices 102 may co-exist and transmit concurrently. In such a case, the server 108 may ask the collector device to identify itself at a specific agreed time. Alternatively, markers 112 can be segregated by means of wavelength (e.g. simultaneous transmission of visible and IR signals) or modulation variation. To preserve anonymity, the server may temporarily assign a modulation sequence to each collector device the first time the collector device transmits a data signal to the server.

Figure 5B:
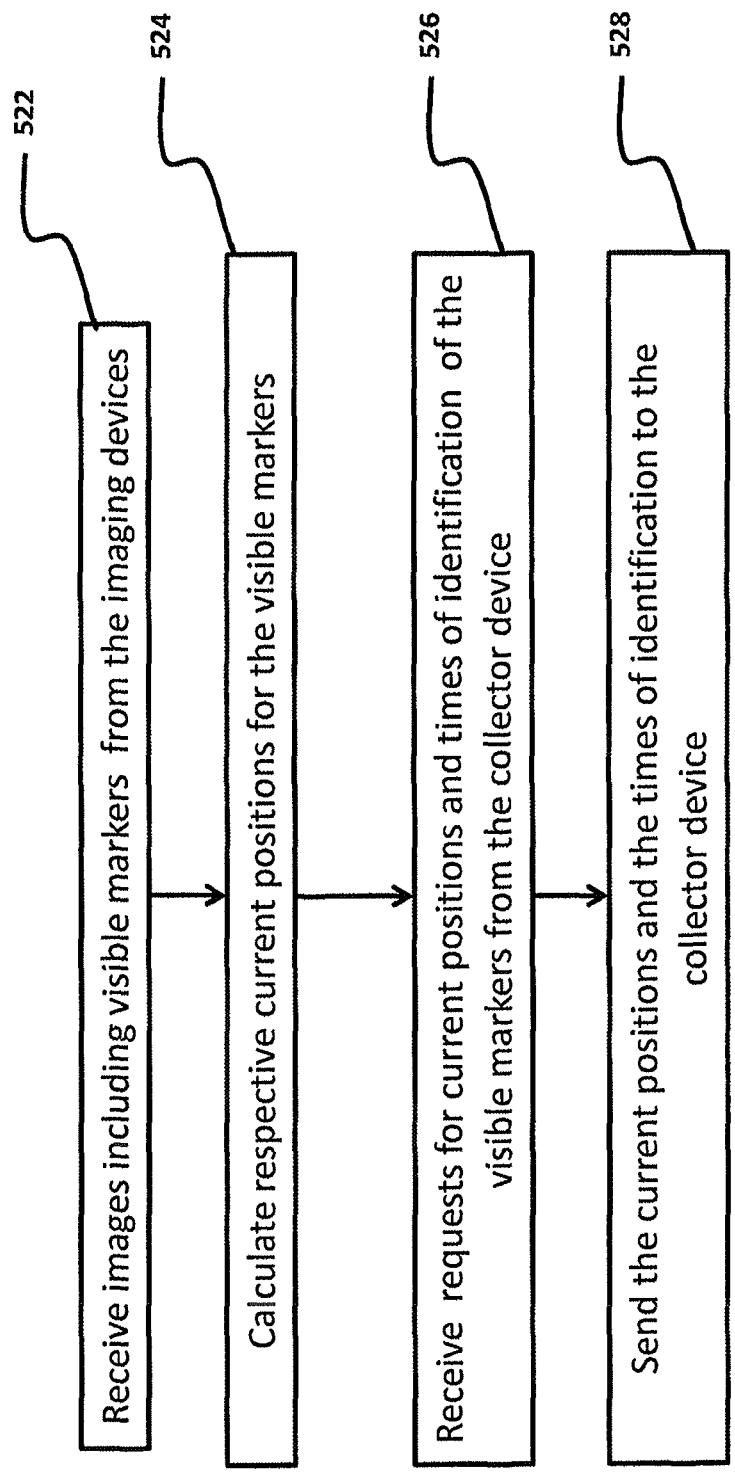
FIG. 5B is a flow-chart diagram of an another embodiment depicting a method of a server transmitting and receiving position information for automatically determining a precise location of the collector device.

FIG. 5B is a flow diagram depicting a more detailed view of an alternative method that may be used by the server 108 in order to assist in precisely locating the position of the collector device 102 in an indoor environment without RF signal sources, as shown in FIG. 1B. At step 522, the server 108 may receive images including markers 112 from the imaging devices 104.

At step 524, the server 108 processes the images in order to calculate current positions corresponding to the markers and times of identification. For example, the processor 220 of the server 108 may process the images containing the markers and calculate the current positions of the collector devices 102 corresponding to the markers 112. Alternatively, the current positions and times of identification of the collector devices may be calculated by the imaging devices 104 and sent to the server 108.

In yet another alternative, the server may also receive coarse position information from the collector devices 102. The coarse position information may be based on floor location information on a map or a known previous position, for example. The server 108 may then check whether the current positions are within the range of uncertainty of the coarse position. This range will vary based on the method used to determine the coarse position.

At step 526, the server 108 receives request from the collector device 102 for the current positions calculated at step 524 and times of identification of the markers. In response to the request, the server 108, at step 528 responds by sending the current positions and times of identification to the collector device 102. The collector device 102 may then match its identity to at least one of the current positions that it received from the server 108 at step 528. For example, the collector device and the server may perform clock synchronization by sending and acknowledging data transmission at a specific agreed time. Once the clocks in the collector device and server are synchronized then the time at which the collector device emits a marker may be used to identify and locate the collector device.

In another example, the server may send modulation schemes to each tracked collector devices with current positions and the collector device may then find its position based on the modulation scheme.

In another embodiment of the invention, tracking of the collector devices may be enabled. For example, each of the collector devices may emit unique markers in different modulation schemes. The current positions of the collector devices 102 corresponding to the markers along with their times of identification may then be calculated either by the imaging devices 104 or by the server 108. The server 108 may store a set of current positions and the times of identification of the collector devices in memory 222, which may be compared to another set of current positions and times of identification. Thus, the compared data may be used to track collector devices in an indoor environment.

The invention has been described in terms of example embodiments. It is contemplated that modifications to these embodiments may be made within the scope of the appended claims.

The invention claimed is:

1. A method for automatically determining a location of a collector device from among a plurality of collector devices associated with a plurality of imaging devices coupled to a server, the method comprising the collector device:
   synchronizing a clock of the collector device with a clock of the server;
   emitting a marker at an emission time, the marker being received by at least one of the plurality of imaging devices;
   receiving a plurality of current positions and corresponding identification times from the server, wherein the plurality of current positions and corresponding identification times are associated with markers identified in images from the plurality of imaging devices; and
   determining the location of the collector device from among the plurality of current positions received from the server by matching the emission time of the marker emitted by the collector device with at least one of the corresponding identification times of the plurality of current positions.

2. The method of claim 1, wherein receiving the plurality of current positions and corresponding identification times from the server comprises receiving the plurality of current positions that are within an uncertainty of a coarse position of the collector device.

3. A method for automatically determining a location of a collector device from among a plurality of collector devices associated with a plurality of imaging devices and a server, the method comprising the server:
   synchronizing a clock of the server with a respective clock of the plurality of collector devices;
   receiving a plurality of images of the plurality of collector devices from the plurality of imaging devices, wherein the plurality of images include images of markers emitted by the plurality of collector devices at respective emission times;
   determining a plurality of current positions and corresponding identification times of the markers identified in the plurality of images;
   receiving a location request from at least one of the plurality of collector devices; and
   responding to the location request from the at least one of the plurality of collector devices by sending the plurality of current positions and corresponding identification times associated with the markers identified in the plurality of images to match against an emission time of a marker emitted by the collector device.

4. A method for automatically determining a location of a collector device from among a plurality of collector devices associated with a plurality of imaging devices coupled to a server, the method comprising the server:
   synchronizing a clock of the server with a respective clock of the plurality of collector devices;
   receiving a plurality of images from the plurality of imaging devices, wherein the plurality of images include images of markers emitted by the plurality of collector devices at respective emission times, wherein the markers are based on unique modulation schemes assigned to each of the plurality of collector devices;
   determining a plurality of current positions and corresponding identification times and modulation schemes of the markers identified in the plurality of images;
   identifying at least one collector device from the plurality of collector devices based on a unique modulation scheme assigned to the at least one collector device;
   receiving a location request from the at least one collector device; and
   responding to the location request from the at least one collector device by sending the plurality of current positions and corresponding identification times and modulation schemes of the markers identified in the images to match against an emission time and the unique modulation scheme of a marker emitted by the at least one collector device.

5. The method of claim 4, further comprising assigning the unique modulation schemes to the plurality of collector devices.

6. A collector device, comprising:
a processor configured with processor-executable instructions to:
synchronize a clock of the collector device with a clock of a server;
emit a marker at an emission time, the marker being received by at least one of a plurality of imaging devices;
receive a plurality of current positions and corresponding identification times from the server, wherein the plurality of current positions and corresponding identification times are associated with markers identified in images from the plurality of imaging devices; and
determine a location of the collector device from among the plurality of current positions received from the server by matching the emission time of the marker emitted by the collector device with at least one of the corresponding identification times of the plurality of current positions.

7. The collector device of claim 6, wherein to receive the plurality of current positions and corresponding identification times from the server, the processor is configured with processor-executable instructions to receive the plurality of current positions that are within an uncertainty of a coarse position of the collector device.

8. A server, comprising:
a processor configured with processor-executable instructions to:
synchronize a clock of the server with a respective clock of a plurality of collector devices;
receive a plurality of images of the plurality of collector devices from a plurality of imaging devices, wherein the plurality of images include images of markers emitted by the plurality of collector devices at respective emission times;
determine a plurality of current positions and corresponding identification times of the markers identified in the plurality of images;
receive a location request from at least one of the plurality of collector devices; and
respond to the location request from the at least one of the plurality of collector devices by sending the plurality of current positions and corresponding identification times associated with the markers identified in the plurality of images to match against an emission time of a marker emitted by the collector device.

9. A server, comprising:
a processor configured with processor-executable instructions to:
synchronize a clock of the server with a respective clock of a plurality of collector devices;
receive a plurality of images from a plurality of imaging devices, wherein the plurality of images include images of markers emitted by the plurality of collector devices at respective emission times, wherein the markers are based on unique modulation schemes assigned to each of the plurality of collector devices;
determine a plurality of current positions and corresponding identification times and modulation schemes of the markers identified in the plurality of images;
identify at least one collector device from the plurality of collector devices based on a unique modulation scheme assigned to the at least one collector device;
receiving a location request from the at least one collector device; and
responding to the location request from the at least one collector device by sending the plurality of current positions and corresponding identification times and modulation schemes of the markers identified in the images to match against an emission time and the unique modulation scheme of a marker emitted by the at least one collector device.

10. The server of claim 9, wherein the processor is further configured with processor-executable instructions to assign the unique modulation schemes to the plurality of collector devices.

* * * * *